(12) United States Patent
Takashima

(10) Patent No.: US 7,778,372 B2
(45) Date of Patent: Aug. 17, 2010

(54) DATA DELIVERY SYSTEM AND METHOD, AND RECEIVER AND TRANSMITTER

(75) Inventor: Masatoshi Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1045 days.

(21) Appl. No.: 10/448,799

(22) Filed: May 30, 2003

(65) Prior Publication Data
US 2004/0032916 A1 Feb. 19, 2004

(30) Foreign Application Priority Data
Jun. 3, 2002 (JP) ............................ 2002-161911

(51) Int. Cl.
*H04L 7/00* (2006.01)
(52) U.S. Cl. ..................... 375/372; 375/371; 375/265; 375/262; 375/341; 375/356; 375/369
(58) Field of Classification Search ................. 375/316, 375/340, 354, 355, 362, 371, 372, 240, 240.01, 375/240.23, 295, 240.1, 240.28, 240.26; 370/229, 230, 232; 368/86
See application file for complete search history.

(56) References Cited

U.S. PATENT DOCUMENTS

| | | | | |
|---|---|---|---|---|
| 4,138,694 A | * | 2/1979 | Doi et al. ....................... | 386/91 |
| 4,954,892 A | * | 9/1990 | Asai et al. ............... | 375/240.23 |
| 5,541,646 A | * | 7/1996 | Huang ......................... | 348/177 |
| 5,652,627 A | * | 7/1997 | Allen .......................... | 348/497 |
| 5,790,543 A | * | 8/1998 | Cloutier ....................... | 370/252 |
| 6,269,078 B1 | * | 7/2001 | Lakshman et al. .......... | 370/230 |
| 6,272,138 B1 | * | 8/2001 | Weon ..................... | 370/395.62 |
| 6,360,271 B1 | * | 3/2002 | Schuster et al. ............. | 709/231 |
| 6,493,043 B1 | * | 12/2002 | Bollmann et al. ........... | 348/714 |
| 6,625,655 B2 | * | 9/2003 | Goldhor et al. ............. | 709/231 |
| 6,658,199 B1 | * | 12/2003 | Hallberg ....................... | 386/68 |
| 6,754,276 B1 | * | 6/2004 | Harumoto et al. ....... | 375/240.26 |
| 6,993,081 B1 | * | 1/2006 | Brunheroto et al. .... | 375/240.28 |
| 7,023,925 B1 | * | 4/2006 | Ward ..................... | 375/240.26 |
| 7,023,942 B1 | * | 4/2006 | Roberts et al. .............. | 375/356 |

(Continued)

FOREIGN PATENT DOCUMENTS

JP 63 120570 5/1988

(Continued)

*Primary Examiner*—Sudhanshu C Pathak
(74) *Attorney, Agent, or Firm*—Frommer Lawrence & Haug LLP; William S. Frommer; Thomas F. Presson

(57) ABSTRACT

Provided is a data delivery system including a transmitter which transmits data stream via a network, and a receiver which receives the data stream and stores it into a reception buffer thereof, and decodes the stored data stream. The network has predetermined therein a necessary amount of data stored in the reception buffer for decoding the received data stream continuously irrespectively of a variation of a time taken for data transfer from the transmitter to the receiver. The receiver starts, after reception of the latter and before the data has been stored up to the predetermined necessary stored amount, decoding of the data stream at a rate lower than assumed at the time of data encoding at the transmitter. When the data has been stored into the reception buffer up to the predetermined necessary stored amount, the receiver changes the decoding data to the assumed rate for decoding further data.

12 Claims, 11 Drawing Sheets

U.S. PATENT DOCUMENTS

| | | | |
|---|---|---|---|
| 2001/0055276 A1* | 12/2001 | Rogers et al. | 370/232 |
| 2002/0009054 A1* | 1/2002 | Suzuki et al. | 370/252 |
| 2002/0026310 A1* | 2/2002 | Mochida et al. | 704/201 |
| 2002/0075857 A1* | 6/2002 | LeBlanc | 370/352 |
| 2003/0169755 A1* | 9/2003 | Ternovsky | 370/412 |
| 2004/0032916 A1* | 2/2004 | Takashima | 375/340 |

FOREIGN PATENT DOCUMENTS

| | | |
|---|---|---|
| JP | 7 170503 | 7/1995 |
| JP | 11 127420 | 5/1999 |
| JP | 2001 169281 | 6/2001 |
| JP | 2002 344394 | 11/2002 |
| JP | 2003 46582 | 2/2003 |
| JP | 2003 143583 | 5/2003 |

* cited by examiner

DATA DELIVERY SYSTEM AND METHOD, AND RECEIVER AND TRANSMITTER

BACKGROUND OF THE INVENTION

1. Field of the Invention

The present invention relates to a data delivery system which delivers digital contents via a network.

This application claims the priority of the Japanese Patent Application No. 2002-161911 filed on Jun. 3, 2002, the entirety of which is incorporated by reference herein.

2. Description of the Related Art

Recently, there has come in a real-time delivery of digital contents such as digital video, digital audio or the like via a network such as Internet.

Referring now to FIG. 1, there is schematically illustrated a conventional data delivery system for real-time delivery of contents over a network. The data delivery system is generally indicated with a reference 101. As shown, the real-time delivery system 101 includes a transmitter 102 to transmit contents, and a receiver 103 to receive the transmitted contents. The transmitter 102 is provided at a contents provider, for example, to deliver contents via a network 104 for example. The receiver 103 is provided at the user that views or listens to the contents received via the network. The network 104 is for example a medium which can transmit data such as Internet, cable broadcast, digitalized terrestrial broadcast, satellite communication system, etc. In such a contents delivery system, contents are real-time delivered from the transmitter 102 to the receiver 103 via the network 104.

The transmitter 102 includes an encoder 111 to encode the contents into a data stream for delivery, and a sending buffer 112 to store the encoded data stream once. The receiver 103 includes a reception buffer 121 to store the received data stream once, and a decoder 122 to decode the data stream stored in the reception buffer 121 into digital contents.

During the data deliver, the transmitter 102 and receiver 103 function as will be described below:

The transmitter 102 is supplied with contents such as video data, audio data or the like real-time produced sequentially. The encoder 111 of the transmitter 102 encodes the contents supplied sequentially to generate a data stream in a predetermined form of transmission. The encoder 111 stores the data stream thus generated into the sending buffer 112 once. Then, the transmitter 102 transmits the data stream stored in the sending buffer 112 to the receiver 103 via the network 104.

When sending the data stream to the network 104, the transmitter 102 appends, to the data stream, a system time clock (STC) which controls a reference clock for the receiver 103 and decoding time stamp (DTS) indicating a time when the receiver 103 starts decoding each access unit. At the transmitter 102, a time when the data stream is to arrive at the receiver 103 is assumed and STC generated based on the assumed arrival time is discretely inserted into the data stream. That is, at the time of encoding, a reference time at which the data stream is to arrive at the receiver 103 is assumed at the transmitter 102, and STC corresponding to the assumed reference arrival time is inserted into the data stream. Also, at the transmitter 102, a time when each access unit is to be decoded at the receiver 103 is assumed and DTS in which the assumed decoding time is stated is appended to each access unit. It should be noted that the access unit is a minimum unit of data stream in which data can singly be decoded. For example, in a video data stream, one frame is equivalent to an access unit. A data stream delivered via the network 104 is a data string in which a plurality of access units is formed continuously.

The receiver 103 receives the data stream delivered via the network 104 and extracts STCs appended to the data stream. The receiver 103 makes PLL control based on STCs discretely included in the data stream and reproduces a reference clock synchronous with time information stated in STCs. The receiver 103 controls the decoding time on the basis of the reference clock.

The reception buffer 121 of the receiver 103 stores the received data stream once. The decoder 122 of the receiver 103 refers to DTS appended to the access unit. When the DTS coincides with the reference clock, the decoder 122 extracts the access unit from the reception buffer 121 and decodes it.

Meanwhile, in the real-time delivery system 101, the data stream will be delivered while the sending buffer 112 and reception buffer 121 are being supplied with data at a fixed ratio when the real-time delivery system 101 is in the steady state without any transmission error of the network. The amounts of data being stored in the sending buffer 112 and reception buffer 121 during data delivery will be explained below with reference to FIG. 2.

Once the transmitter 102 starts data delivery, it will encode the contents access unit by access unit. The encoded data is stored into the sending buffer 112. At this time, the transmitter 102 does not send the data from the sending buffer 112 to the network 104. Therefore, once the transmitter 102 has started the data delivery, the amount of data stored in the sending buffer 112 will increase stepwise.

Next, when the data stream has been stored up to a predetermined amount in the sending buffer 112, the transmitter 102 starts sending the data stream. This predetermined amount of data stream is referred to as "sending margin $B_s$" herein. The sending margin is intended to prevent the data stream sent to the network 104 from being discontinuous even if the data stream has not been encoded as preset because of any failure of the encoder 111 in encoding, for example. Once the data transmission has been started, the data is continuously extracted and sent from the sending buffer 112 at a predetermined transmission rate while the data is stored into the sending buffer 112 up to a predetermined amount at every interval of encoding for one access unit. It should be noted that in the steady state where no encoding error has taken place, the data transfer rate and encode rate are balanced with each other in the transmitter 102 so that the amount of data stored in the sending buffer 112 is constant not being smaller than the sending margin.

Once the transmitter 102 has started sending the data to the network 104, the receiver 103 starts storing the data into the reception buffer 121 thereof. At this time, however, decoding of the data stream is not yet started. So, the amount of data stored in the reception buffer 121 increases at the data transmission rate.

Next, when a predetermined amount of the data stream has been stored in the reception buffer 121, the receiver 103 starts decoding the data stream stored in the reception buffer 121. The predetermined amount of the data stream is referred to as "reception margin $B_R$" herein. The reception margin is intended to prevent the data from being discontinuous even when a jitter takes place in the time for which the data is transferred from the transmitter 102 to the receiver 103 due to the transmission quality of the network 104. That is, when a jitter takes place in the data transmission time of the network 104, the data stream will possibly arrive at the receiver at any other time than assumed at the receiver. If this deviation is large, the data stream will not arrive at the receiver with the output image or sound being discontinuous before the receiver 103 starts the data decoding. The reception margin is provided to prevent such stop of outputting. The magnitude of the reception margin is set larger than assumed, depending upon the transmission quality of the network 104, against a larger jitter than a certain level which will possibly take place.

Once the receiver 103 has started the data decoding, the reception buffer 121 is supplied with data continuously at a predetermined transmission rate while a fixed amount of data is being extracted from the reception buffer 121 at every interval of decoding for one access unit. It should be noted that when the receiver 103 in the steady state where no encoding error such as jitter has taken place in the network 104, the data transfer rate and encode rate are balanced with each other so that amount of data stored in the reception buffer 121 is constant not being smaller than the reception margin.

In case a reception margin is set taking in consideration a jitter in the data transmission time of the network 104 as above, however, the end-to-end delay time from start of data encoding until that of data decoding will be very long. That is, the ento-to-end delay time from start of the contents delivery at the transmitter 102 until the user at the receiver 103 can actually enjoy the contents will be very long.

OBJECT AND SUMMARY OF THE INVENTION

It is therefore an object of the present invention to overcome the above-mentioned drawbacks of the related art by providing a data delivery system, data delivery method, and a receiver and transmitter, in which the time from start of data transmission until that of data decoding is shorter.

The above object can be attained by providing a data delivery system to deliver data from a transmitter to a receiver via a network where it is predetermined a necessary amount of data stored in the receiver for continuously decoding received data stream irrespectively of a variation of time taken for data transfer from the transmitter to the receiver. The data delivery system comprises a transmitter to transmit a data stream via the network, and a receiver to receive the data stream via the network and store it into a reception buffer for decoding the data stream, and to decode the data stream at a rate lower than a rate assumed at the time of encoding until an amount of the data stored in the reception buffer reaches the necessary amount from a start of the reception, and at the same rate as the assumed rate after an amount of the data stored in the reception buffer has reached the necessary amount.

Also the above object can be attained by providing a data delivery method to deliver data from a transmitter to a receiver via a network where it is predetermined a necessary amount of data stored in the receiver for continuously decoding received data stream irrespectively of a variation of time taken for data transfer from the transmitter to the receiver. The data delivery method comprises the steps of transmitting a data stream via the network by the transmitter, receiving the data stream via the network by the receiver, storing the data stream into a reception buffer for decoding the data stream by the receiver, and decoding the data stream by the receiver at a rate lower than a rate assumed at the time of encoding until an amount of the data stored in the reception buffer reaches the necessary amount from a start of the reception, and at the same rate as the assumed rate after an amount of the data stored in the reception buffer has reached the necessary amount.

Also the above object can be attained by providing a receiver included in a data delivery system to deliver data from a transmitter to the receiver via a network where it is predetermined a necessary amount of data stored in the receiver for continuously decoding received data stream irrespectively of a variation of time taken for data transfer from the transmitter to the receiver. The receiver comprises a reception buffer to receive the data stream via the network and to store it for decoding the data stream, and a decoder to decode the data stream at a rate lower than a rate assumed at the time of encoding until an amount of the data stored in the reception buffer reaches the necessary amount from a start of the reception, and at the same rate as the assumed rate after an amount of the data stored in the reception buffer has reached the necessary amount.

Also the above object can be attained by providing a transmitter included in a data delivery system to deliver data from the transmitter to a receiver via a network where it is predetermined a necessary amount of data stored in the receiver for continuously decoding received data stream irrespectively of a variation of time taken for data transfer from the transmitter to the receiver, which receives the data stream via the network and stores it into a reception buffer to decode the data stream at a frequency of a reference clock, upon which the decoding rate depends, which is lower than a one set at the time of encoding until an amount of the data stored in the reception buffer reaches the necessary amount from a start of the reception, and at the same frequency of the reference clock as the one set at the time of encoding after an amount of the data stored in the reception buffer has reached the necessary amount. The transmitter comprises an encoder to include a synchronizing information for generation of the reference clock into the data stream to control the frequency of the reference clock, and a sending buffer to send the data stream including the synchronizing information to the receiver via the network.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The real-time contents delivery systems using a network will be described as embodiments of the present invention with reference to the accompanying drawings.

Figure 1:
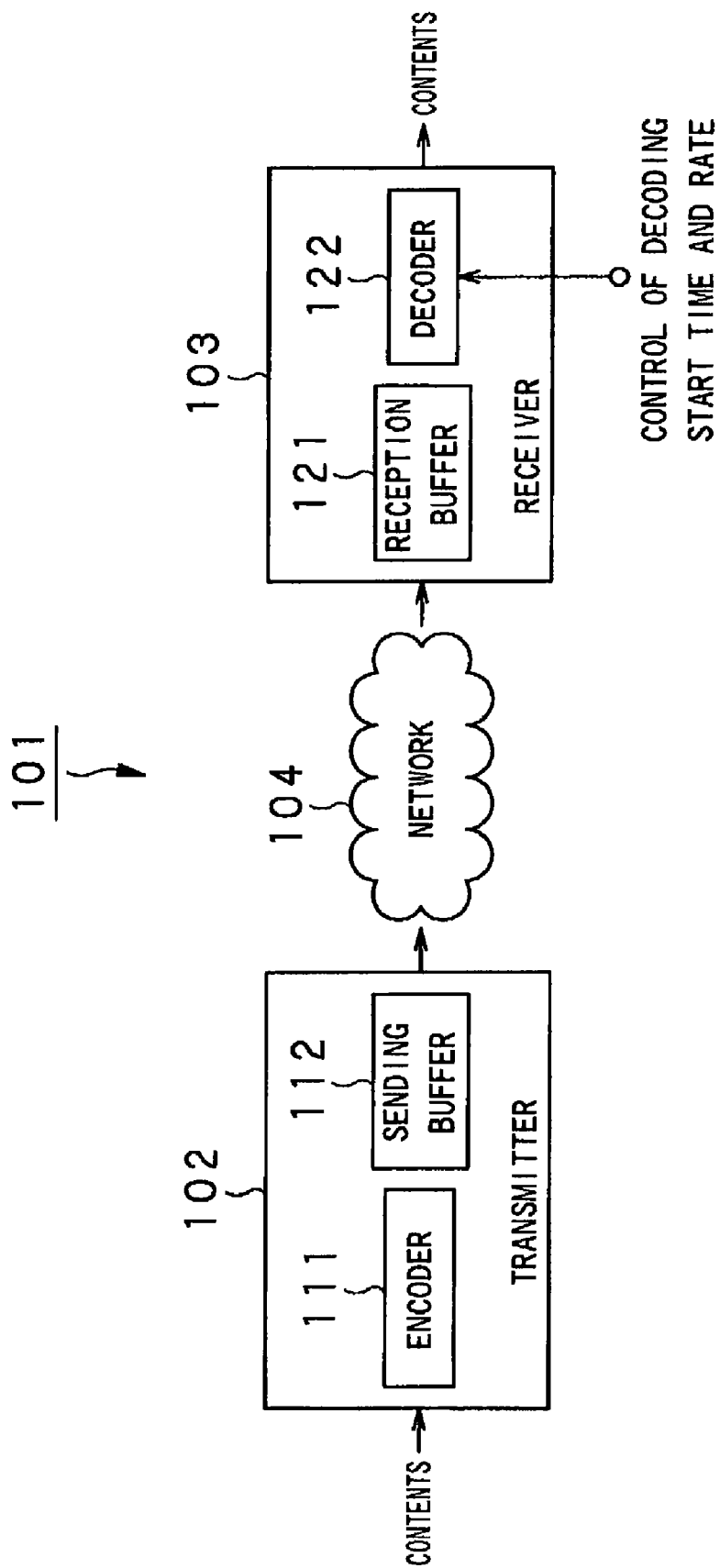
FIG. 1 schematically illustrates the conventional data delivery system.
Figure 2:
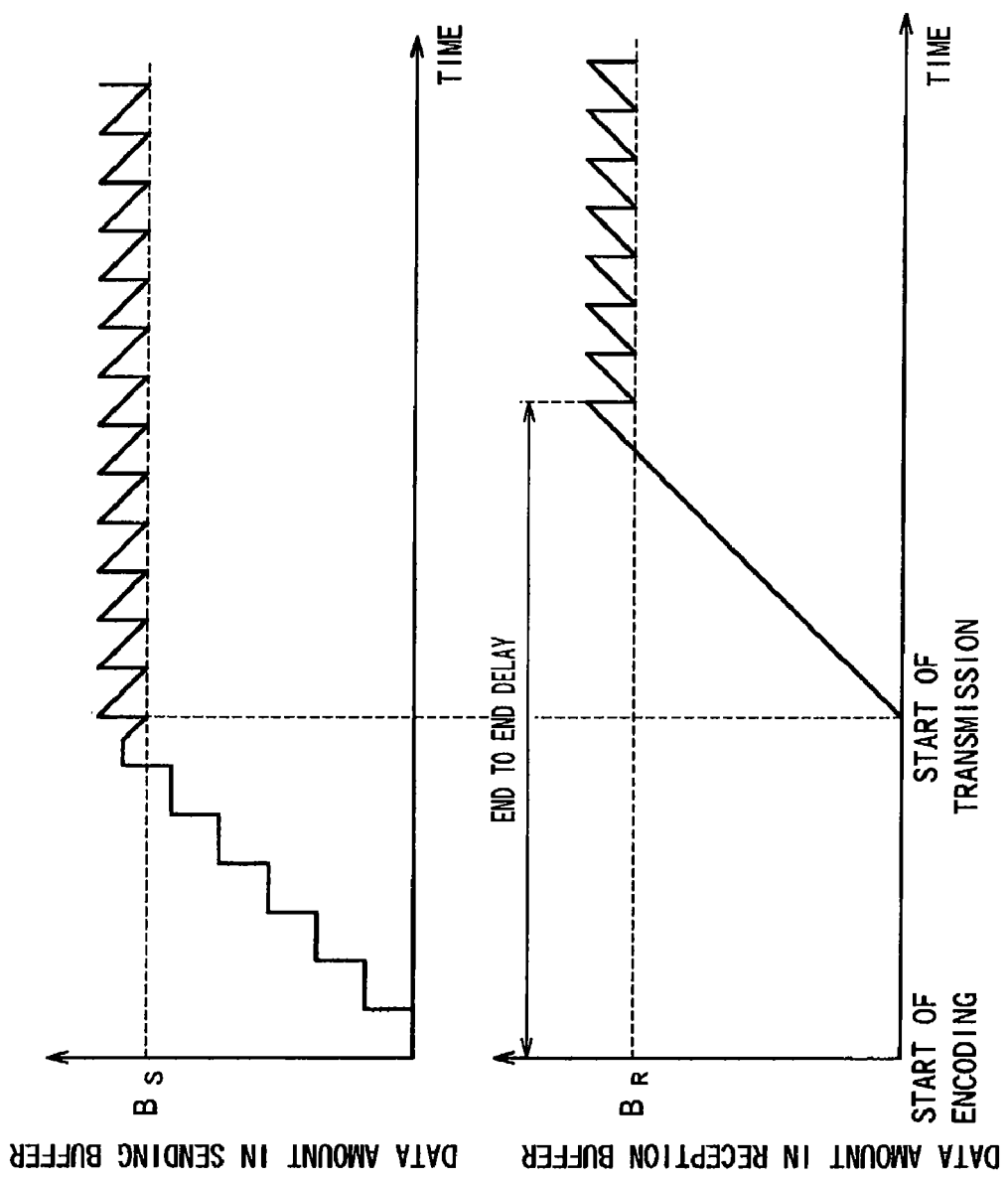
FIG. 2 shows the amounts of data stored in a sending buffer and reception buffer in the conventional data delivery system.
Figure 3:
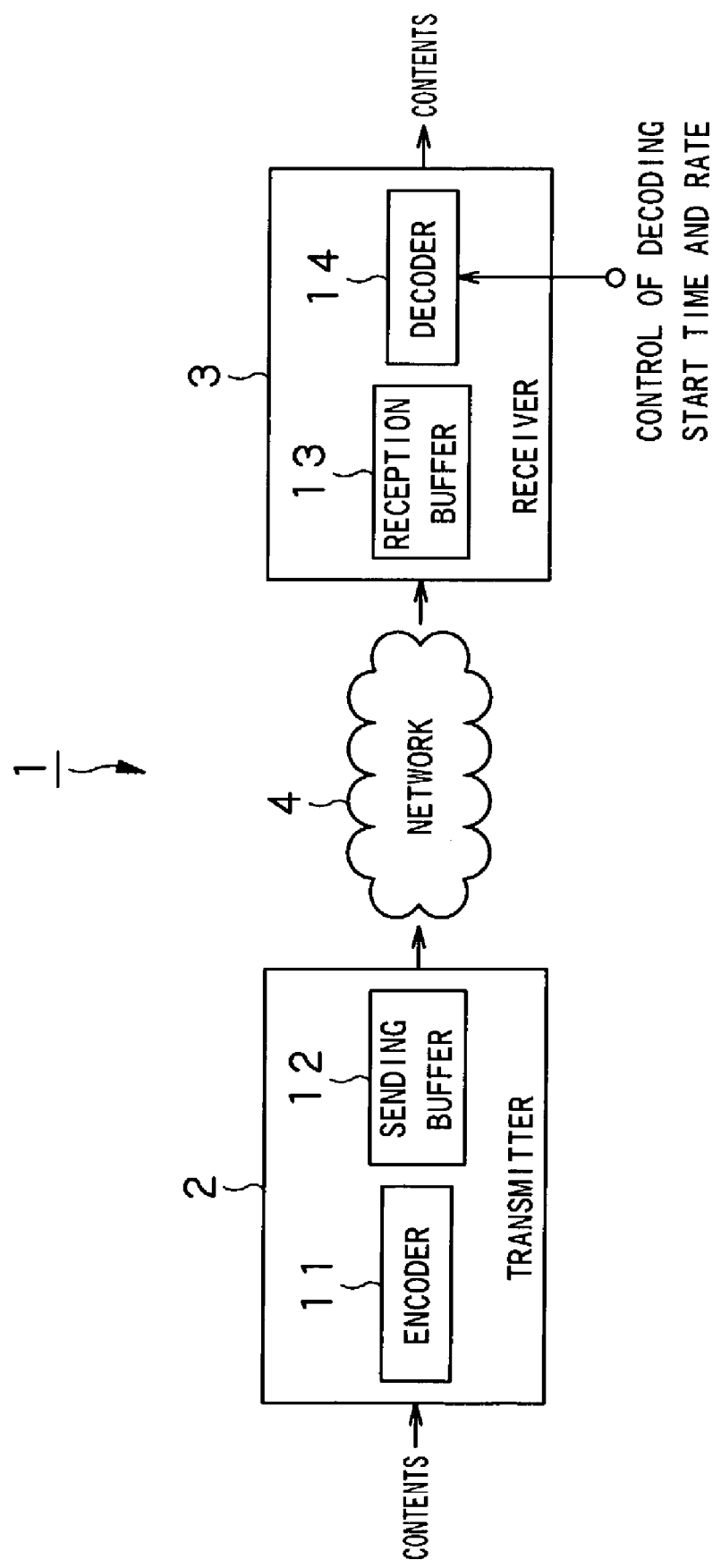
FIG. 3 schematically illustrates a data delivery system according to the present invention.

Referring to FIG. 3, there is schematically illustrated in the form of a block diagram an embodiment of the real-time contents delivery system according to the present invention. The real-time contents delivery system is generally indicated with a reference 1. It includes a transmitter 2 which sends contents, and a receiver 3 which receives the contents sent from the transmitter 2. The transmitter 2 is located at a contents provider, for example, which delivers contents to the user via a network. The receiver 3 is located at the user who views or listens to the contents provided from the contents provider via the network. The network indicated with a reference 4 is a medium capable of transmitting data, such as Internet, cable broadcast, digitalized terrestrial broadcast, satellite communication system, etc. In this contents delivery system, contents are real-time delivered from the transmitter 2 to the receiver 3 via the network 4.

The transmitter 2 includes an encoder 11 which encodes contents into a data stream for delivery, and a sending buffer 12 which stores the encoded data stream once. Also, the receiver 3 includes a reception buffer 13 which stores the received data stream once, and a decoder 14 which decodes digital contents from the data stream.

When distributing data, the transmitter 2 and receiver 3 function as will be described below:

The transmitter 2 is supplied with contents sequentially produced on the real-time basis. The encoder 11 of the transmitter 2 encodes the sequentially supplied contents to generate a data stream in a predetermined delivery format. The encoder 11 stores the generated data stream into the sending buffer 12 once. Then the transmitter 2 sends the data stream once stored in the sending buffer 12 to the receiver 3 via the network 4.

When sending the data stream to the network 4, the transmitter 2 appends, to the data stream, STC (system time clock) for controlling a reference clock for the receiver 3, and DTS (decoding time stamp) indicating a time at which each access unit is decoded. At the transmitter 2, a time when the data stream will arrive at the receiver 3 is assumed, and STC generated on the basis of the assumed arrival time is discretely inserted in the data stream. That is, at the transmitter 2, a reference time for the receiver 3 is assumed when the contents are encoded, and STC corresponding to the assumed reference time is inserted in the data stream. Also, at the transmitter 2, a time when each access unit is to be decoded is assumed, and DTS in which the assumed decoding time is stated is appended to each access unit.

Receiving the data stream via the network 4, the receiver 3 extracts STC from the data stream. The receiver 3 makes PLL control on the basis of STC discretely inserted in the data stream to reproduce the reference clock synchronous with the time information stated in STC. The receiver 3 controls the decoding time on the basis of the reference clock.

The reception buffer 13 of the receiver 3 stores the received data stream once. The decoder 14 of the receiver 3 refers to DTS appended to the access unit, and when there is found a coincidence between DTS and reference clock, the decoder 14 will extract the access unit from the reception buffer 13 and decodes it.

Before the amount of the data stream stored in the reception buffer 13 arrives at the reception margin BR, the receiver 3 starts decoding at a rate lower than a normal decoding rate assumed at the time of encoding the contents into the data stream. Namely, the receiver 3 starts decoding the received data stream at a time earlier than the normal encoding start time for the received data stream, and decodes the received data stream at a rate lower than the normal decoding rate for the received data stream.

The normal decoding rate assumed at the time of encoding the contents is balanced with the data transfer rate over the network 4. Therefore, in case the data stream is decoded at a rate lower than the decoding rate assumed at the time of encoding the data stream, the amount of data stored in the reception buffer 13 will continuously increase even if the data stream is continuously decoded.

Next, when the data stream has been stored into the reception buffer 13 up to the reception margin, the receiver 3 will change, for decoding the data stream hereafter, the decoding rate to the normal decoding rate assumed at the time of data encoding. When the data stream is decoded at the normal decoding rate assumed at the time of data encoding, the reception buffer 13 will be supplied with data with the reception margin being maintained.

Figure 4:
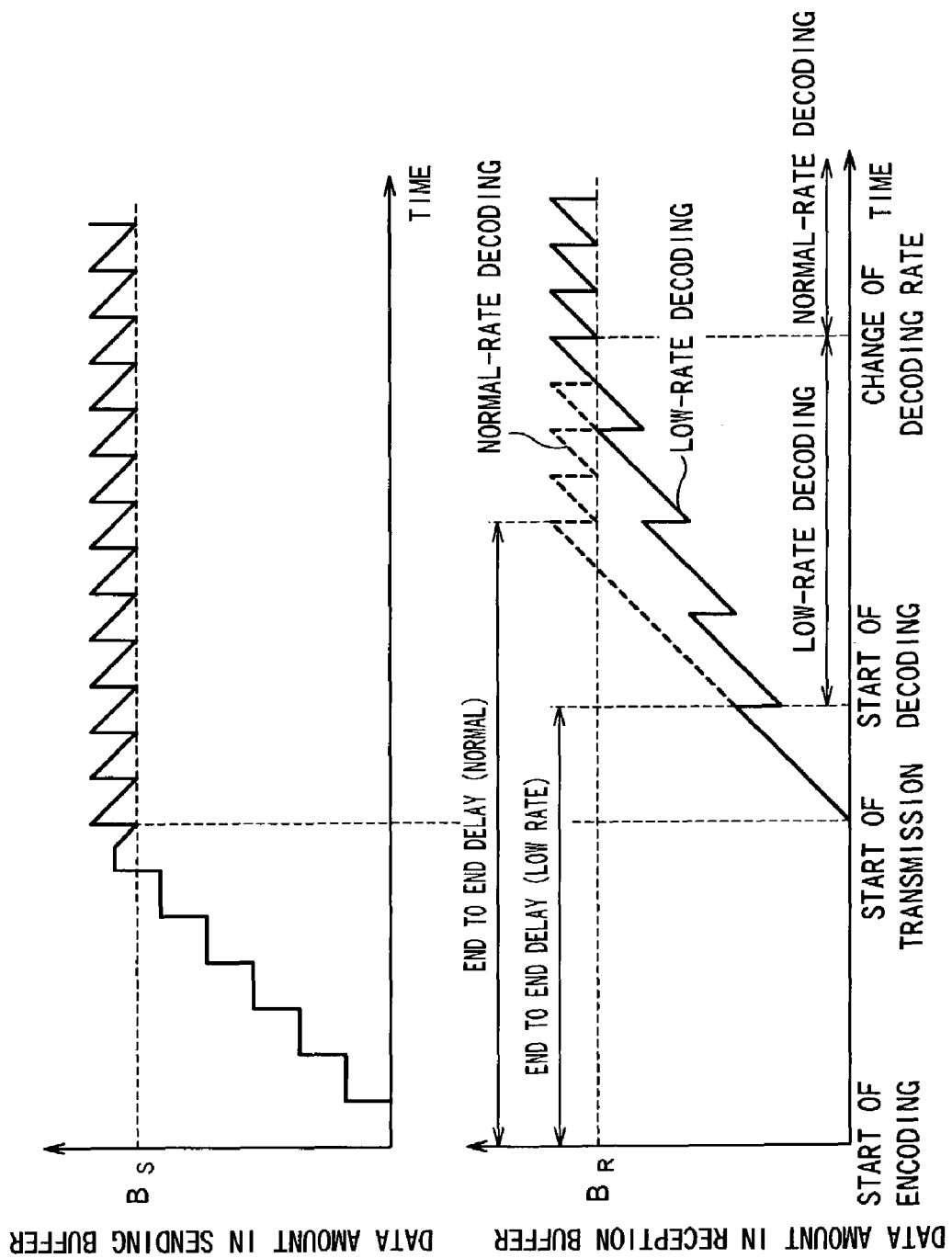
FIG. 4 shows the amounts of data stored in a sending buffer and reception buffer in the real-time delivery system according to the present invention.

With the aforementioned control, the amounts of data stored in the sending buffer 12 and reception buffer 13 change as will be described below with reference to FIG. 4:

When the data delivery is started, the transmitter 2 will encode contents access unit by access unit. The encoded data is stored into the sending buffer 12. At this time, the data will not yet be sent from the sending buffer 12 to the network 4. Therefore, at the start of data delivery, the amount of data stored in the sending buffer 12 will increase stepwise.

Next, when the amount of the data stream stored in the sending buffer 12 reaches the sending margin, the transmitter 2 starts sending the data stream to the network 4. Once the transmitter 2 has thus started sending the data stream to the network 4, data is continuously extracted from the sending buffer 12 at a predetermined transmission rate while a fixed amount of data is being stored at every interval of encoding one access unit. It should be noted that when the transmitter 2 is in the steady state where no encoding error has taken place, the data transfer rate and encoding rate are balanced with each other and the amount of data stored in the sending buffer 12 remains constant not being smaller than the sending margin.

When the transmitter 2 starts sending data to the network 4, the receiver 3 starts storing the data into the reception buffer 13 thereof. At this time, decoding of the data stream is not yet started. Therefore, the amount of data stored in the reception buffer 13 will increase at the data transmission rate.

Then, when the data for more than at least one access unit has been stored in the reception buffer 13, the receiver 3 starts decoding the data stream. The data stream decoding is started earlier than the time having been assumed at the time of encoding the data stream. That is, the receiver 3 will start decoding earlier than the data has been stored into the reception buffer 13 up to the reception margin, not just when the data has been stored in the reception buffer 13 up to the reception margin. Further, the decoding rate is lower than the normal decoding rate assumed at the time of encoding the data stream. Such a lower rate of decoding can be attained by decreasing the rate of the reference clock for the receiver 3 or increasing the interval of decoding each access unit. Once the low-rate decoding is started, the reception buffer 13 is continuously supplied with data at the predetermined transmission rate while a fixed amount of data is being extracted from the reception buffer 13 at every interval of decoding one access unit. In case the decoding is done at the normal rate, the amount of data stored in the reception buffer 13 is constant on the average since the data transmission rate is balanced with the data amount extracted for decoding. However, since the decoding is done at a rate lower than the normal rate, the amount of data stored in the reception buffer increases here. When the data has been stored into the reception buffer 13 up to the reception margin, the receiver 3 will change the decoding rate to the normal one. After that, the data transfer rate and decoding rate are balanced with each other, so that the amount of data stored in the reception buffer 13 will be constant being not smaller than the reception margin.

In the above real-time delivery system according to the present invention, the data stream decoding can be started at a time earlier than the normal decoding start time having been assumed at the time of data encoding. Therefore, in this real-time delivery system, it is possible to reduce the end-to-end delay time from the encoding start until the decoding start. That is to say, it is possible to reduce the time after the transmitter starts delivery of data until the user can actually enjoy the received content.

Note that the present invention can also be applied to a non-real-time delivery system in which a pre-encoded data stream is stored in a server and delivered as well as to the real-time delivery system. More particularly, on the assumption that a model in which the sending margin for the real-time delivery system is infinitely increased is a non-real-time delivery system, the real-time delivery system 1 according to the present invention can be applied as it is to the non-real-time delivery system.

Next, there will be explained in detail the transmitter and receiver which form together the first to fourth embodiments of the real-time delivery system 1 according to the present invention.

Figure 5:
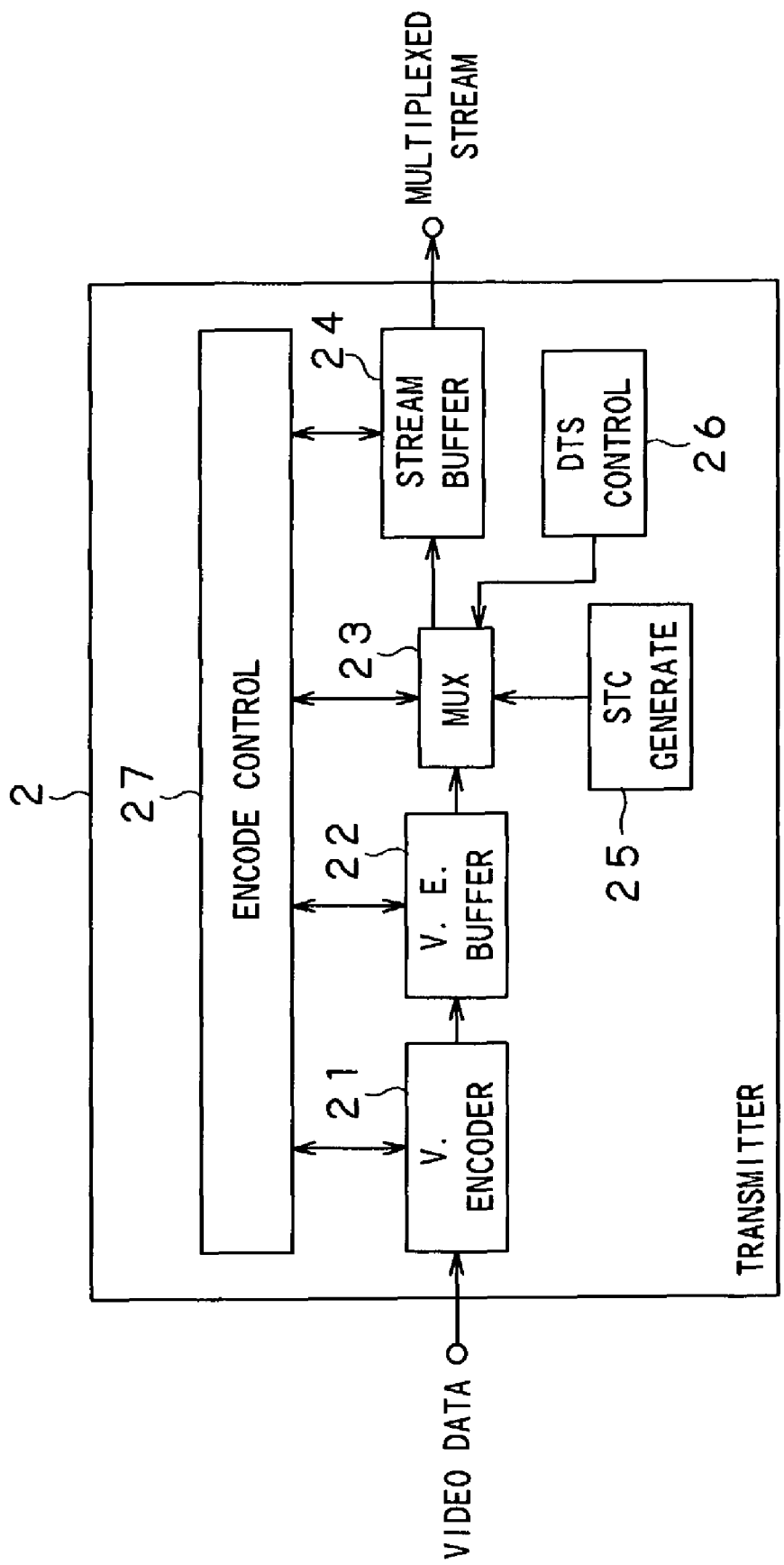
FIG. 5 is a block diagram of a transmitter used in a first embodiment of the real-time delivery system according to the present invention.
Figure 6:
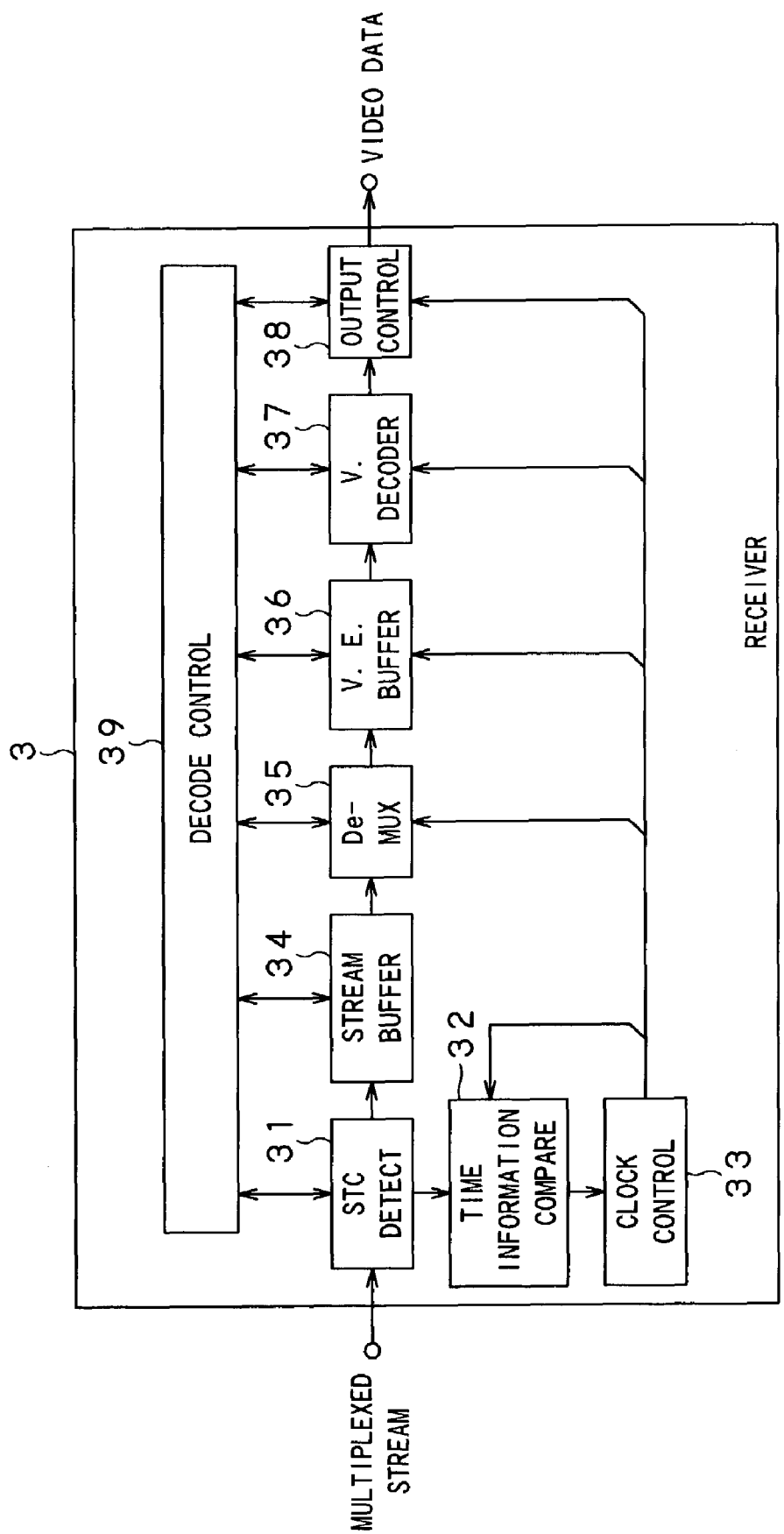
FIG. 6 is a block diagram of a receiver used in the first embodiment of the data delivery system according to the present invention.

First, the transmitter and receiver used in the first embodiment of the real-time delivery system will be described. FIG. 5 is a block diagram of the transmitter included in the first embodiment of the real-time delivery system according to the present invention, and FIG. 6 is a block diagram of the receiver included in the first embodiment of the real-time delivery system. This real-time delivery system is directed for delivery of video data as a content.

As shown in FIG. 5, the transmitter 2 in the first embodiment of the real-time delivery system includes a video encoder (V. encoder) 21, video elementary buffer (V. E. buffer) 22, multiplexer (MUX) 23, stream buffer 24, STC generator 25, DTS controller 26, and an encode controller 27.

The video encoder 21 is supplied with base-band video data. The video encoder 21 encodes the base-band video data according to an encoding standard such as MPEG-2 or MPEG-4 for example to generate a video elementary data stream. The video elementary stream thus generated is stored into the video elementary buffer 22.

The STC generator 25 generates STC which is to be inserted into a multiplexed stream which is to be transmitted over a network. The generated STC is supplied to the multiplexer 23.

The multiplexer 23 multiplexes the video elementary stream stored in the video elementary buffer 22, system data which is to be generated by the encode controller 27, etc. together according to a data transmission standard such as MPEG-2 Systems or the like to generate a multiplexed stream. Also, the multiplexer 23 inserts STC discretely into the multiplexed stream with assumption of a time when the multiplexed stream will arrive at the receiver 3. Also, the multiplexer 23 appends DTS and PTS (presentation time stamp) to each access unit (frame, for example). It should be noted that DTS and PTS may be appended while the video encoder 21 is encoding the contents. The multiplexed stream generated by the multiplexer 23 is stored into the stream buffer 24.

The stream buffer 24 stores the multiplexed stream generated by the multiplexer 23 once, and then sends it to the network 4.

The DTS controller 26 corrects DTS appended by the multiplexer 23 to the multiplexed stream.

The encode controller 27 controls each circuit in the transmitter 2 and generates system data which are to be transmitted to the receiver 3 via the network 4.

As shown in FIG. 6, the receiver 3 used in the first embodiment of the real-time delivery system includes an STC detector 31, time information comparator 32, clock controller 33, stream buffer 34, demultiplexer (De-MUX) 35, video elementary buffer (V. E. buffer) 36, video decoder (V. decoder) 37, output controller 38 and a decode controller 39.

The receiver 3 receives the multiplexed stream transmitted from the transmitter 2 via the network 4. The received multiplexed stream is supplied to the STC detector 31.

The STC detector 31 extracts STC from the received multiplexed stream, and supplies it to the time information comparator 32.

The time information comparator 32 makes a comparison between the STC extracted from the multiplexed stream and a reference clock generated by the clock controller 33 to detect error information on a difference between the STC and reference clock. The error information thus detected is supplied to the clock controller 33.

The clock controller 33 makes PLL control on the basis of the error information detected by the time information comparator 32 to generate a reference clock synchronous with the STC included in the multiplexed stream. The reference clock thus generated by the clock controller 33 is used as a reference time information for each circuit of the receiver 3.

The stream buffer 34 stores the received multiplexed stream.

The demultiplexer 35 divides the multiplexed stream stored in the stream buffer 34 according to each of elements of the multiplexed stream. In the receiver 3 in this first embodiment of the real-time delivery system according to the present invention, the demultiplexer 35 divides the multiplexed stream into video elementary stream and system data. The system data is supplied to the decode controller 39 while the video elementary stream is stored into the video elementary buffer 36.

The video decoder 37 decodes the video elementary stream according to the encoding standard such as MPEG-2 or MPEG-4 for example to generate base-band video data. The generated base-band video data is supplied to the output controller 38.

The output controller 38 controls outputting of the decoded video data.

The decode controller 39 controls each circuit of the receiver 3 and operates based on the system data transmitted to the receiver 3 via the network 4.

In the first embodiment of the real-time delivery system, the stream buffer 34 and video elementary buffer 36 correspond to the reception buffer 13.

In the above real-time delivery system, the interval of decoding the video data is set longer than the normal decoding interval having been assumed at the time of encoding the video data in order to make it possible to store the input data into the receiver 3 while decoding the already stored data. More specifically, the decoding interval is controlled at the transmitter 2 by the DTS controller 26 which corrects DTS appended to the video elementary stream.

Next, the DTS controller 26 corrects DTS as will be detailed below.

First, in case DTS is not corrected by the DTS controller 26, the receiver 3 will start decoding the video elementary stream when the amount of the video elementary stream stored in the reception buffer reaches the reception margin and decode the video elementary stream already at the normal decoding interval assumed at the time of encoding the video data.

It is assumed that a time interval in which the decoding should be started at an earlier time is an offset time Tx. That is, a time interval subtracted from the normal decoding start time is assumed to be an offset time Tx. The DTS controller 26 subtracts this offset time Tx from DTS appended to the first access unit in the video elementary stream. As a result, decoding of the first access unit is started at a time earlier than the decoding start time having been assumed at the time of encoding the video data. More specifically, decoding of the first access unit is started at an earlier time than a time when the amount of the multiplexed stream stored in the receiver 3 reaches the reception margin.

Next, the DTS controller 26 subtracts the offset time Tx from DTS appended to the second and subsequent access units. However, the DTS controller 26 will correct DTS by gradually reducing the offset time Tx for each of the access units so that the decoding interval will be longer than the normal decoding interval having been assumed at the time of encoding the video data, namely, so that the interval between the access units is longer than the normal one. The DTS controller 26 will set the time interval in which the offset time Tx is reduced to a time for which the amount of the multiplexed stream stored in the receiver 3 reaches the reception margin when the offset time Tx becomes zero (0).

Next, the DTS controller 26 will not correct DTS of any access unit for which the offset time Tx has become zero. Therefore, before the amount of the multiplexed stream stored in the receiver 3 reaches the reception margin, the access units will be decoded at a longer interval than the normal decoding interval, and after the amount of the multiplexed stream stored in the receiver 3 reaches the reception margin, the access units will be decoded at the normal interval.

In the aforementioned first embodiment of the real-time delivery system, the decoding interval is controlled at the transmitter side while the multiplexed stream is decoded at the normal interval at the receiver side.

Next, a second embodiment of the real-time delivery system according to the present invention will be described. In this real-time delivery system, the transmitter 2 is identical in construction to the transmitter 2 in the first embodiment as shown in FIG. 5 provided that it does not include the DTS controller 26 and the receiver 3 is identical in construction to the receiver 3 in the first embodiment shown in FIG. 6. Therefore, the transmitter 2 and receiver 3 in this second embodiment of the real-time delivery system will not be illustrated.

In the second embodiment of the real-time delivery system according to the present invention, the interval of decoding video data is set longer than the normal decoding interval having been assumed at the time of encoding the video data in order to make it possible to store the video data into the receiver 3 while decoding the already stored video data, as in the first embodiment of the real-time delivery system. More particularly, in this real-time delivery system, the decoding interval is controlled by the video decoder 37 decoding the access units irrespectively of DTS appended to the video elementary stream.

First, in case the video decoder 37 decodes the video elementary data according to DTS appended to the video elementary stream, decoding of the video elementary stream will be started when the amount of the video elementary stream stored in the receiver 3 reaches the reception margin and the video elementary data will be decoded at the normal decoding interval having been assumed at the time of encoding the video elementary stream.

Figure 7:
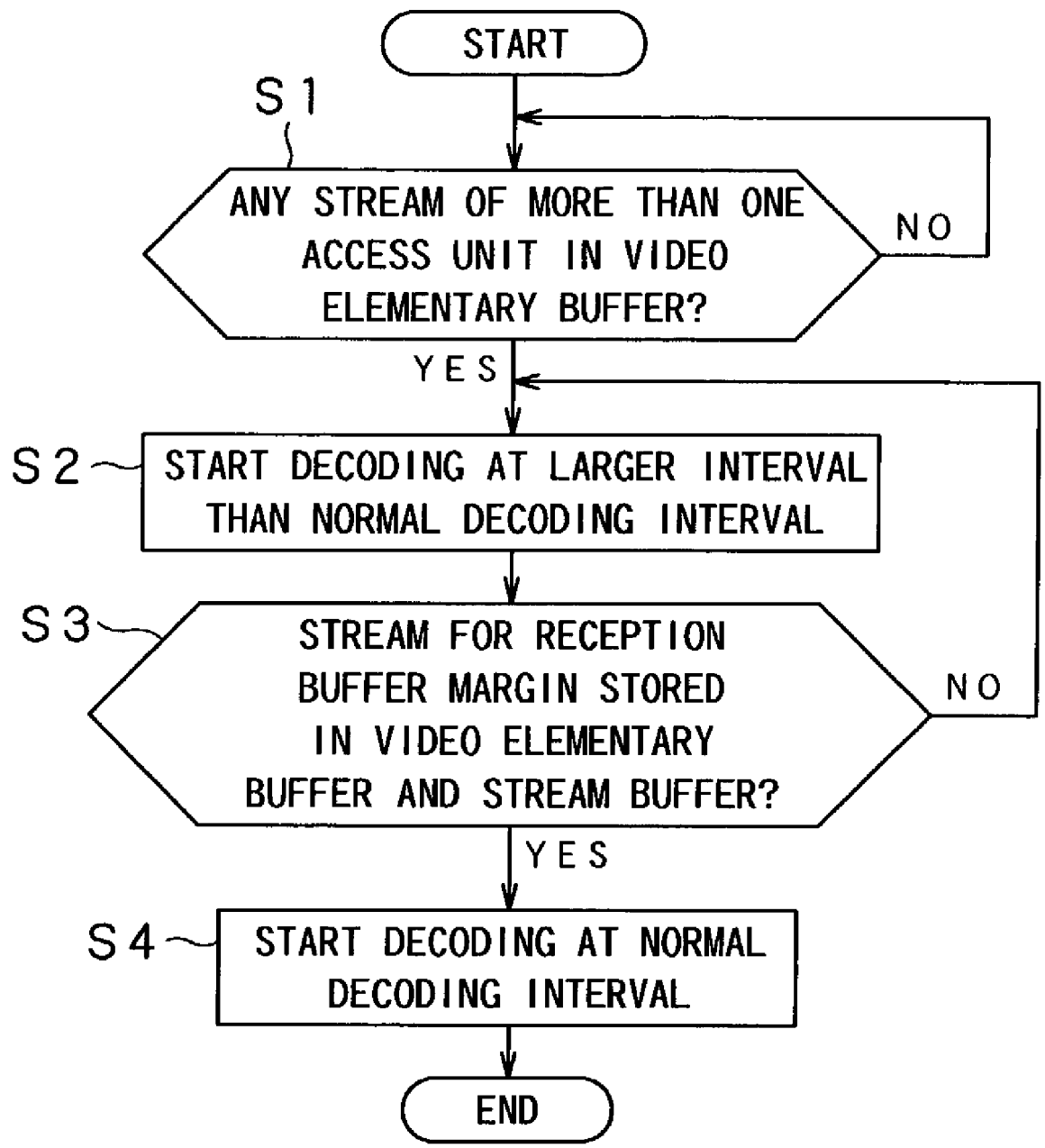
FIG. 7 shows a flow of operations of a video decoder in a second embodiment of the real-time delivery system according to the present invention.

Referring now to FIG. 7, there is shown a flow of operations of the video decoder 37 in the second embodiment of the real-time delivery system. As shown, when data for more than one access unit has been stored in the video elementary buffer 36 (as in step S1), the video decoder 37 starts decoding each access unit at a larger interval than the normal decoding interval (as in step S2). Next, while decoding each access unit at a larger interval than the normal decoding interval, the video decoder 37 detects the amount of data stored in the video elementary buffer 36 and stream buffer 34 and judges whether the multiplexed stream has been stored in a larger amount than the reception margin (as in step S3). If the stored data amount is determined to be larger than the reception margin, the video decoder 37 will start decoding at the normal interval.

In the aforementioned second embodiment of the real-time delivery system, the decoding interval is controlled at the transmitter side while decoding is done at the normal interval at the receiver side.

Figure 8:
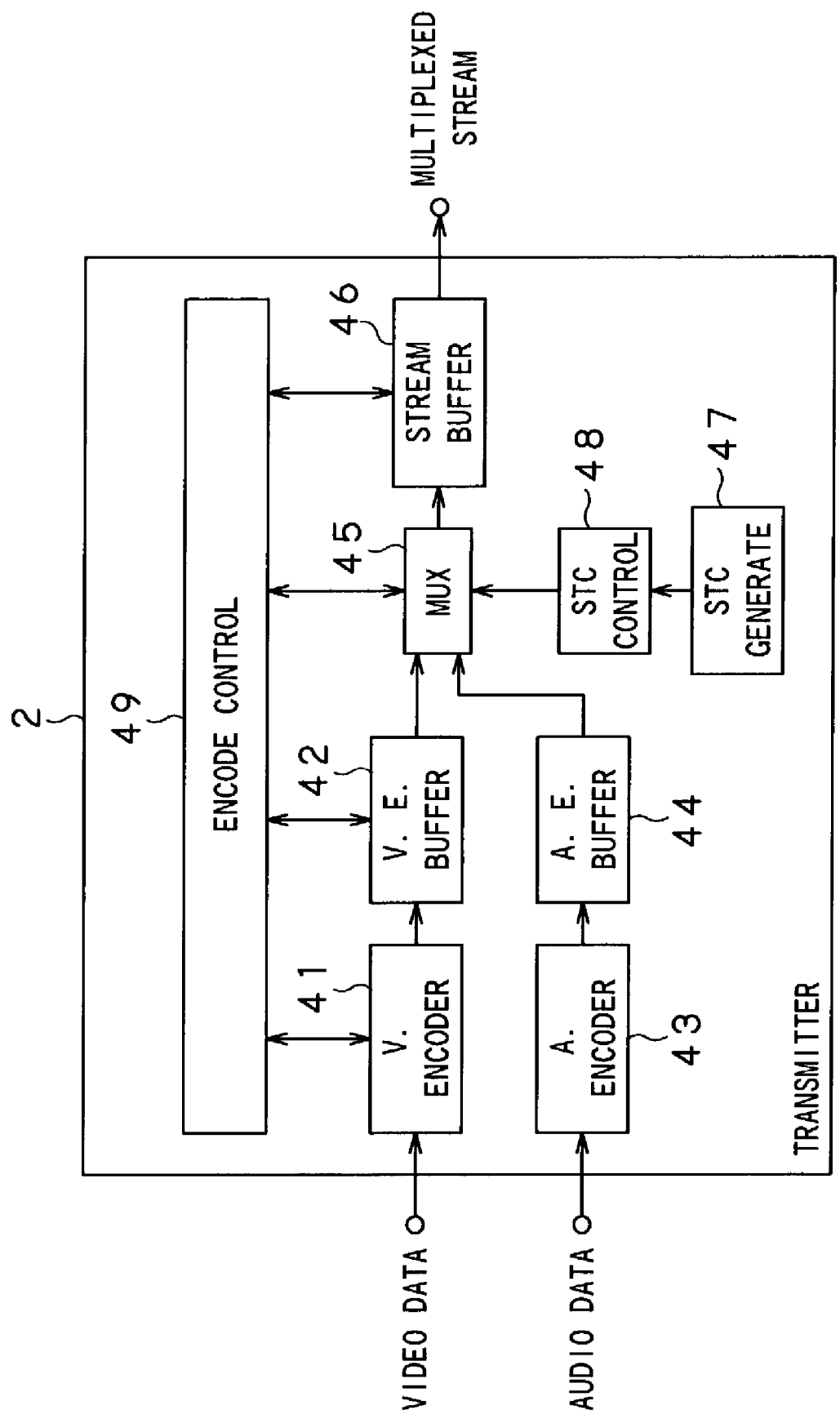
FIG. 8 is a block diagram of a transmitter used in a third embodiment of the real-time delivery system according to the present invention.
Figure 9:
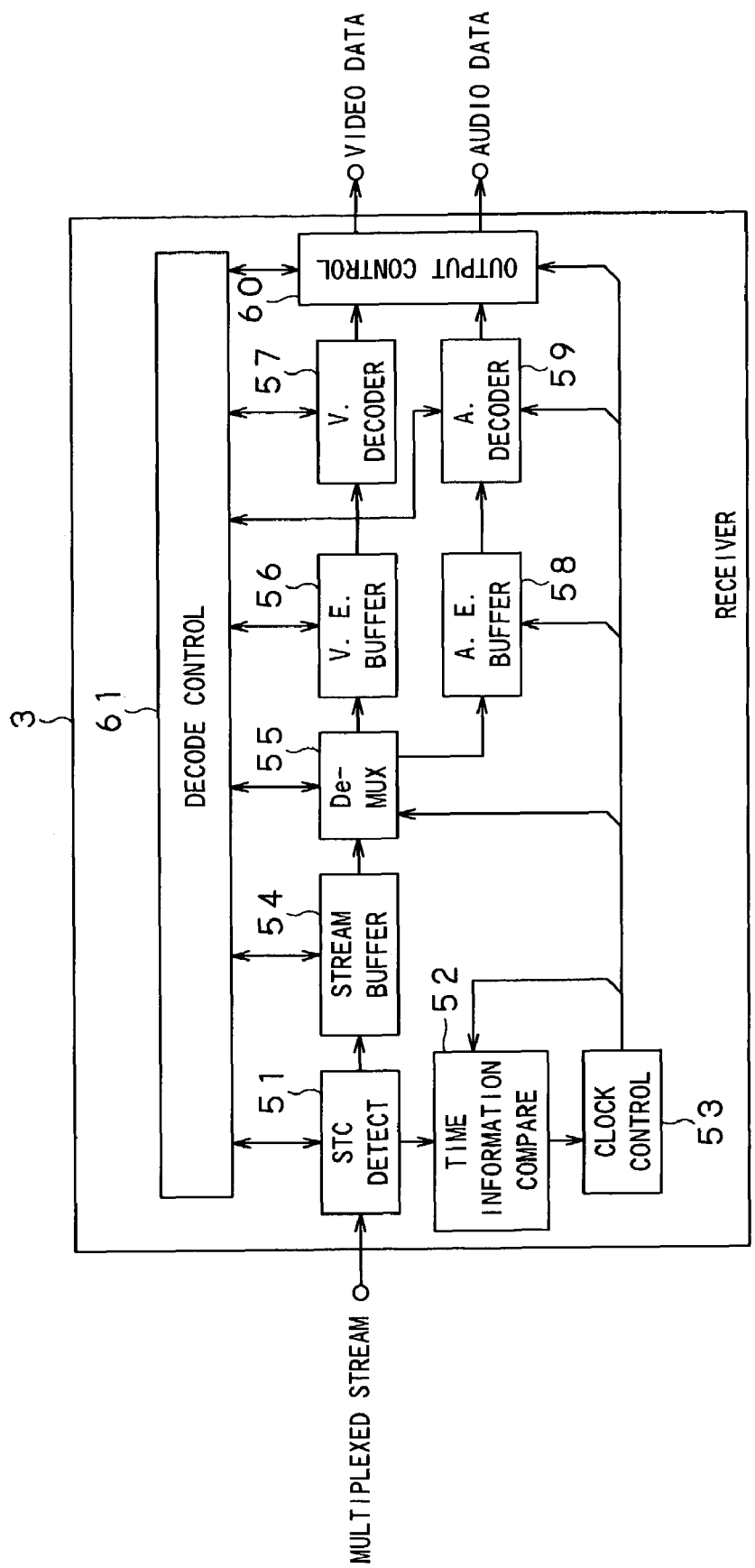
FIG. 9 is a block diagram of a receiver used in the third embodiment of the real-time delivery system according to the present invention.

Next, a third embodiment of the real-time delivery system will be described with reference to FIGS. 8 and 9. This is a real-time delivery system directed for delivery of video and audio data as contents. FIG. 8 is a block diagram of a transmitter 2 included in the third embodiment of the real-time delivery system according to the present invention, and FIG. 9 is a block diagram of a receiver 3 used in the third embodiment of the real-time delivery system.

As shown in FIG. 8, the transmitter 2 used in the third embodiment of the real-time delivery system according to the present invention includes a video encoder (V. encoder) 41, video elementary buffer (V. E. buffer) 42, audio encoder (A. encoder) 43, audio elementary buffer (A. E. buffer) 44, multiplexer (MUX) 45, stream buffer 46, STC generator 47, STC controller 48 and an encode controller 49.

The video encoder 41 is supplied with base-band video data. The video encoder 41 encodes the base-band video data according to the encoding standard such as MPEG-2 or MPEG-4 for example to generate a video elementary stream. The video elementary stream thus generated is stored into the video elementary buffer 42.

The audio encoder 43 is supplied with base-band audio data. The audio encoder 43 encodes the base-band audio data according to the encoding standard such as MPEG-2 or MPEG-4 for example to generate an audio elementary stream. The generated audio elementary stream is stored into the audio elementary buffer 44.

The STC generator 47 generates STC for insertion into a multiplexed stream to be transmitted. The STC thus generated is supplied to the STC controller 48.

The STC controller 48 corrects STC generated by the STC generator 47. The STC thus corrected is supplied to the multiplexer 45.

The multiplexer 45 multiplexes the video elementary stream stored in the video elementary buffer 42, audio elementary stream stored in the audio elementary buffer 44, system data generated by the encode controller 49, etc. according to the transmission standard such as MPEG-2 Systems, for example, to generate a multiplexed stream which is to be transmitted. Also, the multiplexer 45 inserts STC discretely into the multiplexed stream and appends DTS to each access unit (frame, for example). In the transmitter 2, the multiplexed stream generated by the multiplexer 45 is stored into the stream buffer 46.

The stream buffer 46 stores the multiplexed stream generated by the multiplexer 45 once, and then sends it to the network 4.

The encode controller 49 controls each circuit of the transmitter 2, and generates system data which is to be transmitted to the receiver 3 via the network 4.

As shown in FIG. 9, the receiver 3 included in this third embodiment of the real-time delivery system includes an STC detector 51, time information comparator 52, clock controller 53, stream buffer 54, demultiplexer (De-MUX) 55, video elementary buffer (V. E. buffer) 56, video decoder (V. decoder) 57, audio elementary buffer (A. E. buffer) 58, audio decoder (A. decoder) 59, output controller 60 and a decode controller 61.

The receiver 3 receives the multiplexed stream transmitted from the transmitter 2 via the network 4. The received multiplexed stream is supplied to the STC detector 51.

The STC detector 51 extracts STC from the received multiplexed stream, and supplies the extracted STC to the time information comparator 52.

The time information comparator 52 makes a comparison between the STC extracted from the multiplexed stream and a reference clock generated by the clock controller 53 to detect a difference between the STC and reference clock. The error information thus detected is supplied to the clock controller 53.

The clock controller 53 makes PLL control on the basis of the error information detected by the time information comparator 52 to generate a reference clock synchronous with the STC inserted in the multiplexed stream. The reference clock generated by the clock controller 53 is used as reference time information for each circuit of the receiver 3.

The stream buffer 54 stores the received multiplexed stream.

The demultiplexer 55 divides the multiplexed stream stored in the stream buffer 54 according to each of elements of the multiplexed stream. In the receiver 3 in the third embodiment of the real-time delivery system, the demultiplexer 55 divides the multiplexed stream into a video elementary stream, audio elementary stream and system data. The system data is supplied to the decode controller 61, the video elementary stream is supplied to the video elementary buffer 56, and the audio elementary stream is supplied to the audio elementary buffer 58.

The video decoder 57 reads the video elementary stream stored in the video elementary buffer 56 for each access unit, and decodes the base-band video data according to the encoding standard such as MPEG-2 or MPEG-4, for example. It should be noted that the video decoder 57 makes a comparison between DTS included in each access unit of the video elementary stream and the reference clock generated by the clock controller 53, and decodes each access unit at a time when the DTS coincides with the reference clock. The decoded base-band video data is supplied to the output controller 60.

The audio decoder 59 reads the audio elementary stream stored in the audio elementary buffer 58 for each access unit, and decodes the base-band audio data according to the encoding standard such as MPEG-2 or MPEG-4, for example. It should be noted that the audio decoder 59 makes a comparison between DTS included in each access unit of the audio elementary stream and the reference clock generated by the clock controller 53, and decodes each access unit at a time when the DTS coincides with the reference clock. The decoded base-band audio data is supplied to the output controller 60.

The output controller 60 controls outputting of the decoded video and audio data.

The decode controller 61 controls each circuit of the receiver 3, and operates on the basis of the system data transmitted to the receiver 3 via the network 4.

In the third embodiment of the real-time delivery system, the rate of the reference clock for the receiver 3 is set lower than the normal clock rate having been assumed at the time of data encoding, that is, the frequency of the reference clock for decoding can be set smaller than that for encoding in order to make it possible to store the data into the receiver 3 while decoding the data already stored in the receiver 3. More specifically, the STC controller 48 in the transmitter 2 corrects the STC appended to the multiplexed stream to control the rate of the reference clock.

The STC correction by the STC controller 48 will be described in further detail below:

First, in case STC has not been corrected by the STC controller 48, the receiver 3 will start decoding both the video and audio elementary streams when the amount of the video elementary stream stored in the receiver 3 reaches the reception margin, and will decode the video and audio elementary streams at a reference clock rate having been assumed at the time of data encoding.

The STC controller 48 starts, at a time when the first access unit is decoded, adding an offset time Ty to STC appended to a multiplexed stream. The first access unit is not decoded at a time when the amount of video elementary stream stored in the receiver 3 reaches the reception margin but at a time when the amount of audio elementary stream stored in the receiver 3 reaches the reception margin. Generally, audio data is smaller in amount than video data. Thus, the reception margin set with a jitter of the network taken in consideration is smaller for audio data than for video data. Therefore, when decoding is started at a time when the amount of audio data stored in the receiver 3 reaches the reception margin, the amount of video data stored in the receiver 3 will have not yet reached the reception margin.

The offset time Ty added as above is zero for the first access unit and is increased as the time passes.

Next, when the amount of video data stored in the receiver 3 reaches the reception margin, increasing the offset time Ty is stopped, and the last offset time Ty added is continuously added to the subsequent STC. Therefore, before the multiplexed stream amount stored in the receiver 3 reaches the reception margin, decoding is done at a rate lower than the normal reference clock, and after the multiplexed stream amount stored in the receiver 3 reaches the reception margin, decoding is done at the normal reference clock rate.

In the aforementioned the third embodiment of the real-time delivery system, the reference clock rate is controlled at the transmitter side while decoding is done at the normal reference clock rate at the receiver side.

Figure 10:
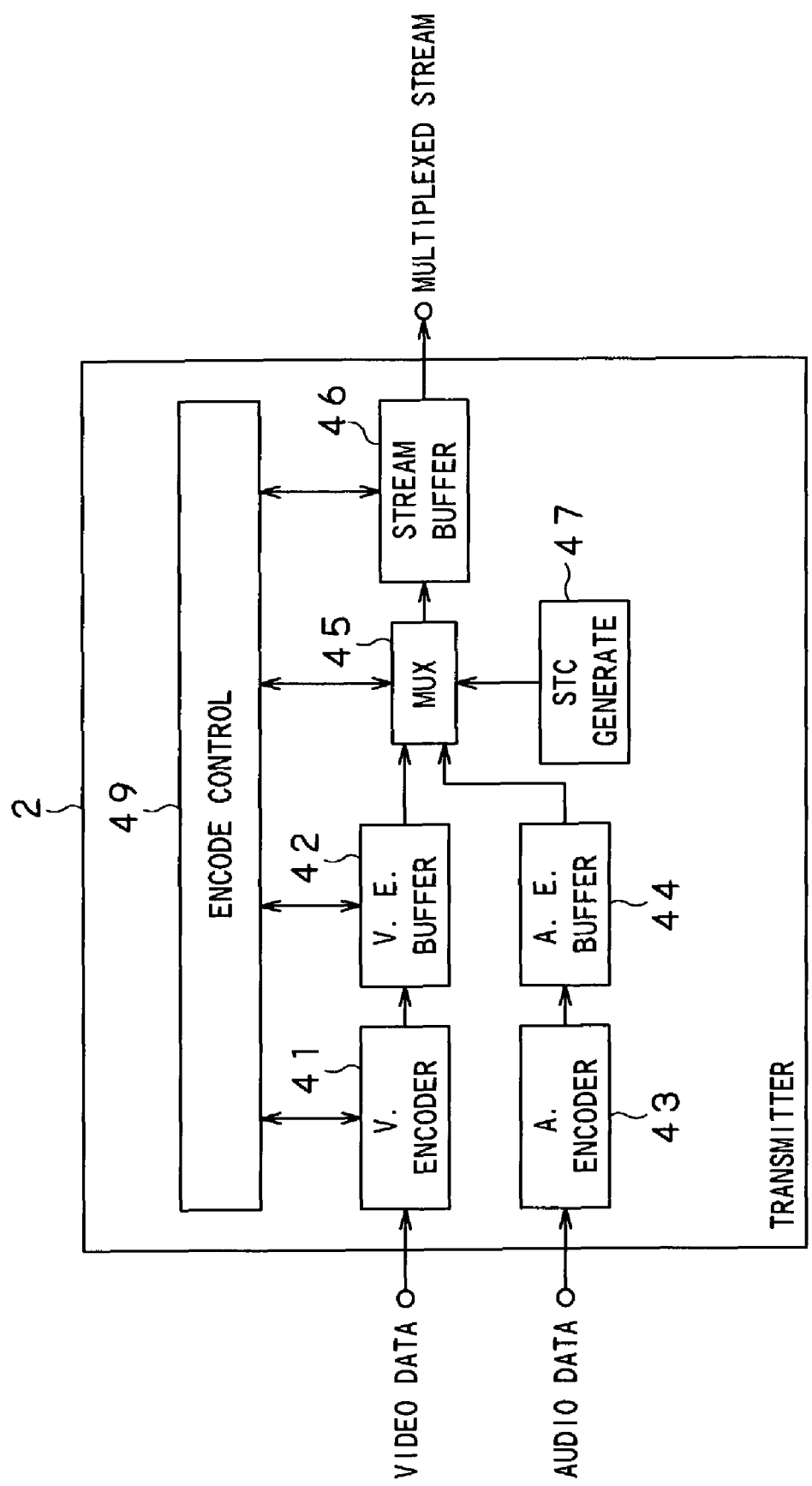
FIG. 10 is a block diagram of a transmitter used in a fourth embodiment of the real-time delivery system according to the present invention.
Figure 11:
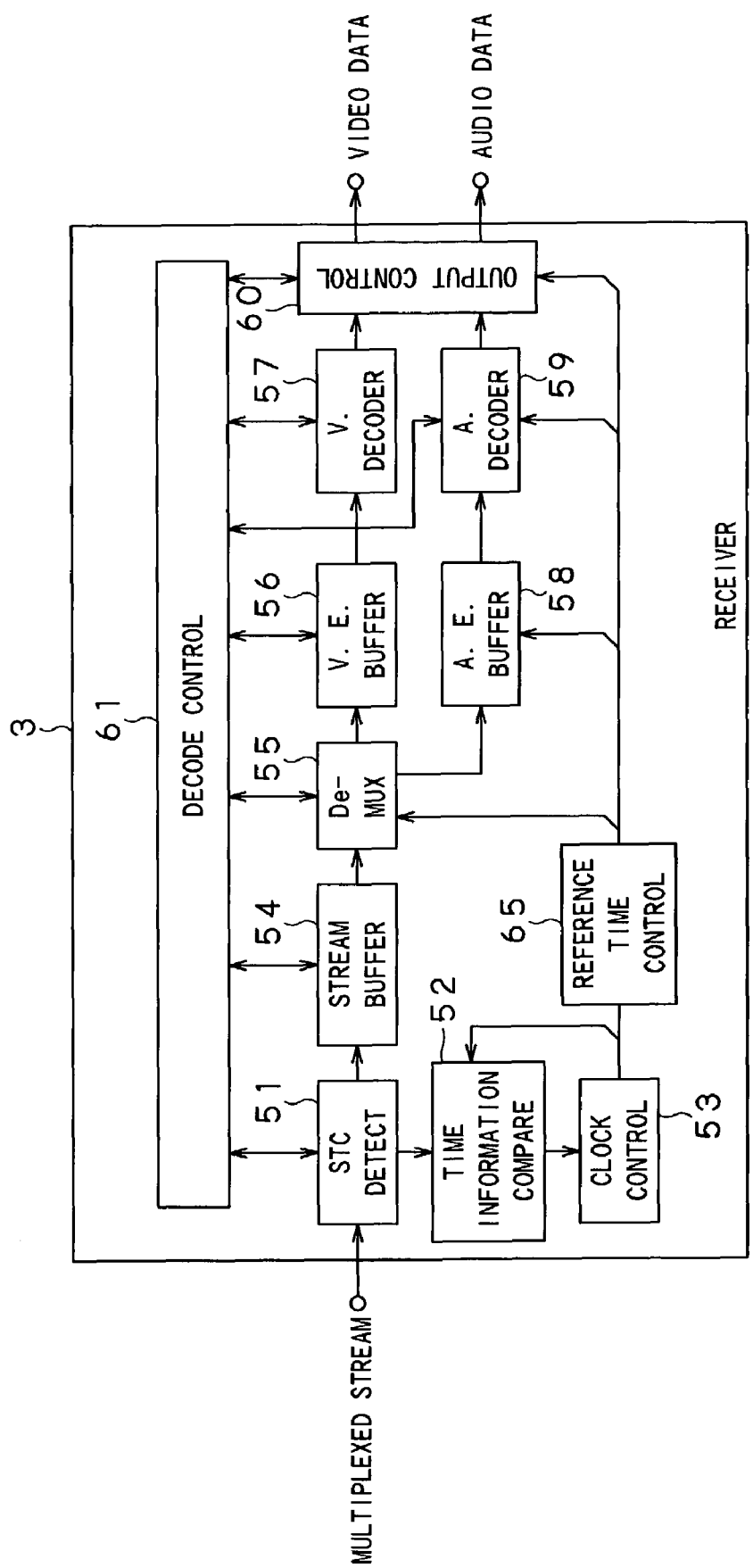
FIG. 11 is a block diagram of a receiver used in the fourth embodiment of the real-time delivery system according to the present invention.

Next, a fourth embodiment of the real-time delivery system according to the present invention will be described with reference to FIGS. 10 and 11. This real-time delivery system is directed for delivery of video and audio data as contents. FIG. 10 is a block diagram of the transmitter 2 used in the fourth embodiment of the real-time delivery system according to the present invention, and FIG. 11 is a block diagram of the receiver used in this fourth embodiment of the real-time delivery system. It should be noted that in this fourth embodiment, the same or similar elements as or to those in the third embodiment are indicated with the same or similar references as or to those in FIGS. 8 and 9.

In this fourth embodiment of the real-time delivery system according to the present invention, the transmitter 2 includes a video encoder (V. encoder) 41, video elementary buffer (V. E. buffer) 42, audio encoder (A. encoder) 43, audio elementary buffer (A. E. buffer) 44, multiplexer (MUX) 45, stream buffer 46, STC generator 47 and an encode controller 49. The transmitter 2 in the fourth embodiment is identical in construction to the that in the third embodiment of the real-time delivery system provided that it does not include the STC controller 48. Namely, at the transmitter, no STC correction is done.

As shown in FIG. 11, the receiver 3 in the fourth embodiment of the real-time delivery system according to the present invention includes an STC detector 51, time information comparator 52, clock controller 53, stream buffer 54, demultiplexer (De-MUX) 55, video elementary buffer (V. E. buffer) 56, video decoder (V. decoder) 57, audio elementary buffer (A. E. buffer) 58, audio decoder (A. decoder) 59, output controller 60, decode controller 61, and a reference time controller 65.

The reference time controller 65 is provided to correct the value of the reference clock supplied to each circuit in the receiver 3. However, it should be noted that it will not correct the value of the reference clock supplied to the time information comparator 52.

In the fourth embodiment of the real-time delivery system, the rate of the reference clock for the receiver 3 is set lower than the normal clock rate having been assumed at the time of data encoding, that is, the frequency of the reference clock for decoding can be set smaller than that for encoding in order to make it possible to store the data into the receiver 3 while decoding the data already stored in the receiver 3. More specifically, the reference time controller 65 at the receiver 3 controls the rate of the reference clock.

The correction of reference clock rate by the reference time controller 65 will be described in detail below:

First, in case the reference clock has not been corrected by the reference time controller 65, the receiver 3 will start decoding both the video and audio elementary streams when the amount of the video elementary stream stored in the receiver 3 reaches the reception margin, and will decode the video and audio elementary streams at a reference clock rate having been assumed at the time of data encoding.

The reference time controller 65 starts, at a time when the first access unit is decoded, adding an offset time Ty to the reference clock appended to a multiplexed stream. The first access unit is not decoded at a time when the amount of video elementary stream stored in the receiver 3 reaches the reception margin but at a time when the amount of audio elementary stream stored in the receiver 3 reaches the reception margin. Generally, audio data is smaller in amount than video data. Thus, the reception margin set with a jitter of the network taken in consideration is smaller for audio data than for video data. Therefore, when decoding is started at a time when the amount of audio data stored in the receiver 3 reaches the reception margin, the amount of video data stored in the receiver 3 will have not yet reached the reception margin.

The offset time Ty added as above is zero at the decoding start time and increased as the time passes.

Next, when the amount of video data stored in the receiver 3 reaches the reception margin, the offset time Ty is stopped from being increased, and the last offset time Ty added is continuously added for the subsequent reference clocks. Therefore, before the multiplexed stream amount stored in the receiver 3 reaches the reception margin, decoding is done at a rate lower than the normal reference clock, and after the multiplexed stream amount stored in the receiver 3 reaches the reception margin, decoding is done at the normal reference clock rate.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

In the data delivery system and method, and receiver and transmitter according to the present invention, having been described in the foregoing, it is predetermined a necessary amount of data stored in the receiver for continuously decoding received data stream, and the received data stream is decoded at a rate lower than a rate assumed at the time of encoding until an amount of the data stored in the reception buffer reaches the necessary amount from a start of reception, and at the same rate as the assumed rate after an amount of the data stored in the reception buffer has reached the necessary amount.

Thus, the present invention enables to reduce the time from start of data transmission until start of data decoding.

What is claimed is:

1. A data delivery system, comprising:
   a transmitter including an encoder to encode a data stream at an encoding rate, and a transmission buffer to transmit the data stream via a network; and
   a receiver including:
      a reception buffer to receive said data stream via the network; and
      a decoder to start decoding said data stream at a low decoding rate which is lower than a normal decoding rate after data for more than one access unit is received by the reception buffer, the decoder detecting an amount of data stored in the reception buffer, to determine whether the amount reaches a predetermined amount, and to start decoding said data stream at the normal decoding rate based on a determining result that the amount is larger than the predetermined amount,
   wherein said receiver decodes said data stream at a decoding frequency which is lower than an encoding frequency until an amount of data stored in the reception buffer reaches the predetermined amount after a start of reception,
   wherein said receiver decodes said data stream at a frequency which is approximately the same as the encoding frequency after an amount of data stored in the reception buffer has reached the predetermined amount,
   wherein the transmitter corrects a decoding start time of each access unit with an offset time that is gradually adjusted, the offset time being adjusted to zero when the stored data in the reception buffer is determined to reach the predetermined amount according to a predetermined transfer rate and the known low decoding rate, and
   wherein the normal decoding rate is a decoding rate at a steady state after the amount of data stored in the reception buffer reaches the predetermined amount.

2. The data delivery system according to claim 1, wherein said transmitter supplies said receiver with synchronizing information for generation of a reference clock by including the synchronizing information in said data stream, to control decoding frequency based on the reference clock.

3. The data delivery system according to claim 1, wherein said receiver changes synchronizing information, which is included in the data stream, for generation of a reference clock to control decoding frequency.

4. The data delivery system according to claim 1,
wherein said receiver decodes the access unit of said data stream at a decoding interval which is larger than a corresponding encoding interval until an amount of data stored in the reception buffer reaches the predetermined amount, and
wherein said receiver decodes the access unit of said data stream at an interval which is approximately the same as the corresponding encoding interval after an amount of data stored in the reception buffer has reached the predetermined amount.

5. The data delivery system according to claim 4, wherein said transmitter supplies said receiver with timing information, which indicates a timing for decoding said access unit, by including the timing information in said data stream, to control decoding interval of the access unit.

6. The data delivery system according to claim 4, wherein said receiver changes timing information, which indicates a timing for decoding said access unit included in the data stream, to control interval of decoding the access unit.

7. A data delivery method, comprising:
encoding a data stream at an encoding rate;
transmitting the encoded data stream via a network at the encoding rate,
wherein said transmitting is executed using a transmitter, said transmitter including an encoder to encode the data stream at the encoding rate, and a transmission buffer to transmit the data stream via the network;
receiving said transmitted data stream via the network;
storing said received data stream into a reception buffer;
starting to decode said buffered data stream at a low decoding rate which is lower than a normal decoding rate after data for more than one access unit is received by the reception buffer;
detecting an amount of data stored in the reception buffer;
determining whether the amount reaches a predetermined amount;
starting to decode said data stream at the normal decoding rate based on a determining result that the amount is larger than the predetermined amount;
decoding said data stream at a decoding frequency which is lower than an encoding frequency until an amount of data stored in the reception buffer reaches the predetermined amount after a start of reception; and
decoding said data stream at a frequency which is approximately the same as the encoding frequency after an amount of data stored in the reception buffer has reached the predetermined amount,
wherein the transmitter corrects a decoding start time of each access unit with an offset time that is gradually adjusted, the offset time being adjusted to zero when the stored data in the reception buffer is determined to reach the predetermined amount according to a predetermined transfer rate and the known low decoding rate, and
wherein the normal decoding rate is a decoding rate at a steady state after the amount of data stored in the reception buffer reaches the predetermined amount.

8. The data delivery method according to claim 7, further comprising:
decoding the access unit of said data stream at a decoding interval which is larger than a corresponding encoding interval until an amount of data stored in the reception buffer reaches the predetermined amount; and
decoding the access unit of said data stream at an interval which is approximately the same as the corresponding encoding interval after an amount of data stored in the reception buffer has reached the predetermined amount.

9. A receiving apparatus, comprising:
a receiver to receive a data stream from a network;
a reception buffer to store said received data stream;
a decoder to start decoding said buffered data stream at a low decoding rate which is lower than a normal decoding rate after data for more than one access unit is received by the reception buffer, the decoder detecting an amount of data stored in the reception buffer, to determine whether the amount reaches a predetermined amount, and to start decoding said data stream at the normal decoding rate based on a determining result that the amount is larger than the predetermined amount; and
a reference clock oscillating at a reference frequency,
wherein said decoder decodes said data stream at a decoding frequency of the reference clock which is lower than an encoding frequency until an amount of data stored in the reception buffer reaches the predetermined amount after a start of reception,
wherein said decoder decodes said data stream at a frequency of the reference clock which is approximately the same as the encoding frequency after an amount of data stored in the reception buffer has reached the predetermined amount,
wherein the transmitter corrects a decoding start time of each access unit with an offset time that is gradually adjusted, the offset time being adjusted to zero when the stored data in the reception buffer is determined to reach the predetermined amount according to a predetermined transfer rate and the known low decoding rate, and
wherein the normal decoding rate is a decoding rate at a steady state after the amount of data stored in the reception buffer reaches the predetermined amount.

10. The receiving apparatus according to claim 9, wherein said decoder changes synchronizing information, which is included in the received data stream, to control said reference frequency of said reference clock.

11. The receiving apparatus according to claim 9,
wherein said decoder decodes the access unit of said data stream at a decoding interval which is larger than a corresponding encoding interval until an amount of data stored in the reception buffer reaches the predetermined amount, and
wherein said receiver decodes the access unit of said data stream at an interval which is approximately the same as the corresponding encoding interval after an amount of data stored in the reception buffer has reached the predetermined amount.

12. The receiving apparatus according to claim 11, wherein said decoder changes a timing information, which indicates a timing for decoding said access unit included in the data stream, to control an interval of decoding the access unit.

* * * * *